(12) United States Patent
Holostov et al.

(10) Patent No.: US 8,707,439 B2
(45) Date of Patent: Apr. 22, 2014

(54) SELECTING SECURITY OFFERINGS

(75) Inventors: Vladimir Holostov, Hadera (IL); Yigal Edery, Pardesia (IL); David B. Cross, Caesarea (IL)

(73) Assignee: Microsoft Corporation, Redmond, WA (US)

(*) Notice: Subject to any disclaimer, the term of this patent is extended or adjusted under 35 U.S.C. 154(b) by 885 days.

(21) Appl. No.: 12/339,106

(22) Filed: Dec. 19, 2008

(65) Prior Publication Data

US 2010/0162346 A1 Jun. 24, 2010

(51) Int. Cl.
*H04L 29/14* (2006.01)

(52) U.S. Cl.
USPC .......................................... 726/25; 705/7.28

(58) Field of Classification Search
None
See application file for complete search history.

(56) References Cited

U.S. PATENT DOCUMENTS

| | | | |
|---|---|---|---|
| 6,742,128 B1* | 5/2004 | Joiner .............................. | 726/25 |
| 6,873,988 B2 | 3/2005 | Herrmann et al. | |
| 6,990,660 B2* | 1/2006 | Moshir et al. .................. | 717/171 |
| 7,000,247 B2* | 2/2006 | Banzhof .......................... | 726/2 |
| 7,086,050 B2 | 8/2006 | Barton et al. | |
| 7,278,163 B2 | 10/2007 | Banzhof et al. | |
| 7,346,922 B2 | 3/2008 | Miliefsky | |
| 7,533,413 B2* | 5/2009 | Samuelsson et al. ........... | 726/22 |
| 7,627,891 B2* | 12/2009 | Williams et al. ............... | 726/1 |
| 7,647,622 B1* | 1/2010 | Sobel et al. ..................... | 726/1 |
| 7,917,938 B2* | 3/2011 | Jacobson ......................... | 726/1 |
| 2004/0003266 A1* | 1/2004 | Moshir et al. .................. | 713/191 |
| 2004/0006704 A1* | 1/2004 | Dahlstrom et al. ............ | 713/200 |
| 2005/0060558 A1* | 3/2005 | Hussain et al. ................ | 713/189 |
| 2005/0177874 A1* | 8/2005 | Suzuki et al. .................. | 726/26 |
| 2005/0257214 A1* | 11/2005 | Moshir et al. .................. | 717/171 |
| 2006/0101514 A1* | 5/2006 | Milener et al. ................. | 726/22 |
| 2006/0101519 A1* | 5/2006 | Lasswell et al. ................ | 726/25 |
| 2007/0143392 A1 | 6/2007 | Choe et al. | |
| 2007/0180522 A1* | 8/2007 | Bagnall .......................... | 726/22 |
| 2008/0005555 A1 | 1/2008 | Lotem et al. | |
| 2008/0244691 A1 | 10/2008 | Hilerio et al. | |
| 2010/0043052 A1* | 2/2010 | Park et al. ....................... | 726/1 |
| 2010/0269175 A1* | 10/2010 | Stolfo et al. .................... | 726/22 |
| 2011/0113471 A1* | 5/2011 | Hjelm et al. .................... | 726/1 |
| 2012/0185944 A1* | 7/2012 | Abdine et al. ................. | 726/25 |

OTHER PUBLICATIONS

"Multi-Layer Security Platforms the New Definition for Best of Breed", retrieved at <<http://www.fortinet.com/doc/whitepaper/MultiLayerSecurityPlatforms.pdf>>, A Fortinet White Paper, Jun. 2006, pp. 1-10.

"Malicious Code Management Service", retrieved at <<http://www.morningtowngroup.com/other_services.htm>>, Oct. 7, 2008, pp. 3.

"Microsoft Forefront Client Security", retrieved at <<http://download.microsoft.com/download/A/A/1/AA14D117-651C-4D89-8A16-6B8A0019E7FF/MFCS_Datasheet.pdf>>, pp. 2.

"PatchLink Update", retrieved at <<http://www.lumension.com/patch-management.jsp>>, Oct. 7, 2008, pp. 11.

* cited by examiner

*Primary Examiner* — Michael R Vaughan
(74) *Attorney, Agent, or Firm* — Ben Tabor; Kate Drakos; Micky Minhas (57) ABSTRACT

Methods, systems, and computer-readable media are disclosed for selecting a set of security offerings. A particular method includes receiving a security need profile associated with a computing environment and receiving security offering information related to a plurality of security offerings. The security offerings of the plurality of security offerings are evaluated with respect to the security need profile. A set of security offerings from the plurality of security offerings are automatically selected.

20 Claims, 6 Drawing Sheets

SELECTING SECURITY OFFERINGS

BACKGROUND

Computing environments face many security risks. Many vendors provide security offerings to counteract, mitigate or address different types of security risks. However, because of the large number of vendors, and different types of offerings it is often difficult for owners or administrators of computing environments to select which security offerings to use. Additionally, the available security offerings may change frequently, making re-evaluation of security offerings even more cumbersome. For example, new types of security threats may arise, new security offerings may become available, prices of security offerings may change, quality of security offerings may change, and so forth. Due to the factors discussed above, selecting security offerings for a computing environment can be a time consuming and burdensome process. Additionally, keeping current on trends in the security landscape (e.g., emerging threats) and new security offerings can also be quite time consuming and burdensome. Thus, an owner or administrator of a computing environment may postpone selecting security offerings for the computing environment, or neglect to update the security offerings used, which may leave the computing environment vulnerable to security risks or cause inefficiency in spending related to security.

SUMMARY

A system is used to automatically select one or more security offerings for use at a computing environment. The system compares information about security offerings (e.g., functions, costs, requirements) and information about the computing environment (e.g., needs and constraints) to select one or more security offerings for use at the computing environment. The system may also receive information about security risks (e.g., a security assessment or security landscape) and select the one or more security offerings based on the information about security risks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method of selecting a set of security offerings is disclosed. The method includes receiving a security need profile associated with a computing environment and receiving security offering information related to a plurality of security offerings. The method includes automatically evaluating security offerings with respect to the security need profile. The method further includes automatically selecting a set of security offerings from the plurality of security offerings.

In another illustrative embodiment, a system includes a network interface and a user or program interface configured to receive a security need profile associated with a computing environment. The system also includes an evaluation and acquisition module coupled to the network interface. The evaluation and acquisition module is configured to receive a list of security offerings and to receive evaluation data related to each security offering in the list of security offerings. The evaluation and acquisition module compares each security offering in the list of security offerings to the security need profile to determine a match level. The evaluation and acquisition module automatically selects at least one security offering from the list of security offerings based on the match level.

According to another illustrative embodiment, a computer-readable medium includes instructions that, when executed by a computer, cause the computer to receive a security need profile associated with a computing environment and to receive a list of security offerings. The instructions further cause the computer to receive evaluation data related to each security offering in the list of security offerings. The instructions also cause the computer to compare each security offering in the list of security offerings to the security need profile to determine a match level and to automatically select a set of security offerings from the list of security offerings based on the match level. The selected security offerings may be recommended to a user or may be automatically deployed at the computing environment.

Figure 1:
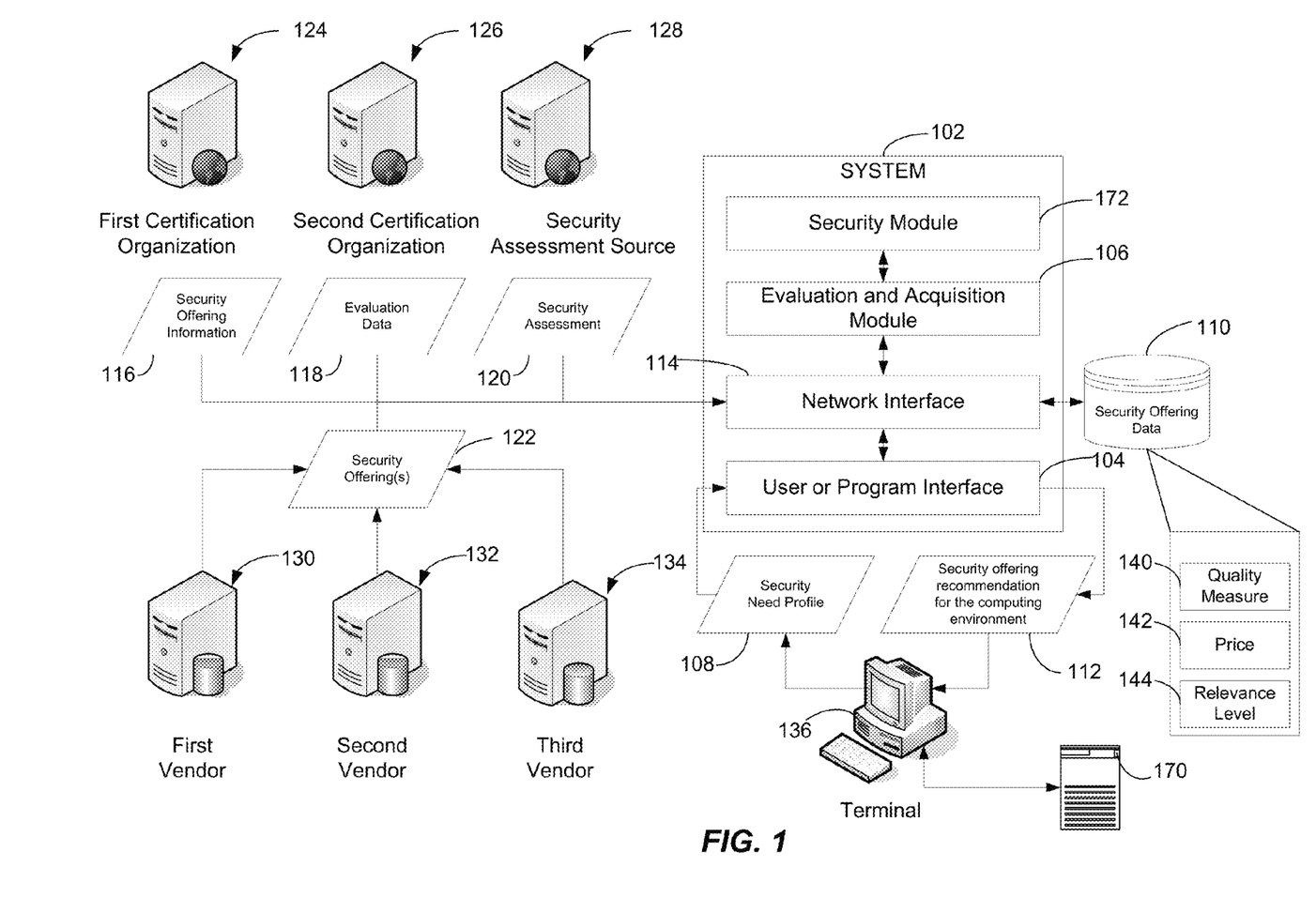
FIG. 1 depicts a first particular embodiment of a system to select security offerings coupled to remote systems that support the selection of the security offerings.

FIG. 1 depicts a first particular embodiment of a system 102 that is adapted to select security offerings and is coupled to remote systems that support the selection of the security offerings. A security offering refers to a product, service, or data used by the product or service to protect computing assets. For example, a business may have a plurality of computing assets, such as desktop computers, portable computers, routers, switches, etc., coupled to a local area network, a wide area network, or both. If unprotected, the computing assets may be vulnerable to various security risks, such as malware, unauthorized intrusion, unsolicited messaging (e.g., SPAM), among others. Security offerings are adapted to provide protection against one or more of these types of security risks.

In a particular embodiment, the system 102 is adapted to select security offerings for a computing environment based on information provided about the computing environment. To that end, the system 102 may include a user or program interface 104 adapted to receive information regarding the computing environment. In a particular embodiment, the information received regarding the computing environment may include a security need profile 108. The security need profile 108 may include information descriptive of the computing environment, information about users of the computing environment, information about uses of the computing environment, other information and constraints that are relevant to the selection of one or more security offerings for the computing environment, or any combination thereof. The information descriptive of the computing environment may include particular computing assets that are present (e.g., how many of various types of computers are present), particular software applications that are present (e.g., operating systems or application software that is accessible to the computing assets), roles of particular computing assets (e.g., types of services provided by the computing assets), configuration information (e.g., how the computing assets are interconnected logically and/or physically), security systems that are already in place, other information that is relevant to the selection security offerings for the computing environment, or any combination thereof.

The information descriptive of the users of the computing environment may include information about the level of sophistication of the user, the number of users, access rights of the users, other information about the users that is relevant to the selection security offerings for the computing environment, or any combination thereof. The information descriptive of the uses of the computing environment may include a desired security level against various threats (e.g., a high security against intrusions and lower security for unsolicited email), specific uses of the computing environment (e.g., secure data storage, virtual private network access, email access, internet access, publishing, forward access, etc.), other information about specific uses of the computing environment that is relevant to the selection security offerings, or any combination thereof. Examples of other information that may be included in the security need profile include cost or budget constraints, such as a one-time budget for purchasing security offerings, an on-going budget (e.g., a monthly or annual budget) for security offerings (e.g., for subscription costs, updates, maintenance, etc.), other constraints, such as space limitations, available hardware, and so forth.

The security need profile 108 may also include relevance information. The relevance information may indicate how important various aspects of security of the computing environment are to an entity associated with the computing environment (such as an owner, operator or administrator of the computing environment). For example, the relevance information may indicate that protection against unauthorized access it more important than protection against unsolicited email. In another example, the relevance information may indicate that upfront cost (e.g., initial purchase cost) is more important than on-going costs (e.g., subscription costs). Any of the other aspects of the security need profile 108 may also be associated with relevance information to indicate the particular concerns and priorities to be considered while evaluating security offerings for the computing environment.

In a particular embodiment, the security need profile 108 is provided to the system 102 via the user or program interface 104 by one or more users (e.g., a system administrator) of the computing environment. In another particular embodiment, the security need profile 108 is provided to the system 102 via the user or program interface 104 by a program that collects the information included in the security need profile from the computing environment. In still another particular embodiment, the security need profile 108 is provided to the system 102 via the user or program interface 104 in part by one or more users of the computing environment and in part by a program. For example, a program may analyze the computing environment to determine at least a portion of the information of the security need profile, and a user may provide the remaining information. To illustrate, the program may analyze the computing environment to identify hardware elements that are present, software applications that are present, roles of various computing assets, uses of the computing environment, and other information about the computing environment that can be determined automatically by a program; whereas human specified information, such as priorities and budgets, may be provided by the user.

The system 102 also includes a network interface 114. The network interface 114 is adapted to communicate via one or more networks with a plurality of remote resources to receive information to select one or more security offerings. For example, the system 102 may communicate with one or more certification organizations, such as a first certification organization 124 and a second certification organization 126, via the network interface 114. In an illustrative embodiment, the certification organizations 124, 126 provide various information about security offerings that are available. For example, as illustrated in FIG. 1, the first certification organization 124 may provide security offering information 116. The security offering information 116 may be descriptive of various security offerings, such as features, functions, requirements, options, or other information about the security offerings. The security offering information 116 may also indicate whether a security offering complies with a particular standard.

Further, as illustrated in FIG. 1, the second certification organization 126 may provide evaluation data 118. The evaluation data 118 may include information descriptive of one or more evaluations of various security offerings. For example, the evaluation data 118 may include user evaluations of a security offering (e.g., how well the user perceives the security offering to perform various functions, ease of use of the security offering, ease of installation of the security offering, stability of the security offering, problems identified with the security offering, etc.). In another example, the evaluation data 118 may include objective testing information regarding a security offering (e.g., statistics regarding security threats successfully addressed during a particular test, results of compatibility tests, etc.). In yet another example, the evaluation data 118 may include ratings information based on user reviews, objective testing, or both.

In a particular embodiment, the system 102 also communicates with a security assessment source 128 to gather a security assessment 120. The security assessment 120 may also be referred to as a security landscape. The security assessment 120 may include information descriptive of emerging security threats or trends that may be useful for selecting security offerings. For example, the security assessment source 128 may monitor security threats or gather security threat information and provide the security assessment 120 as a summary of the security threat information. To illustrate, when a particular type of security threat emerges or becomes more prevalent (e.g., when intrusion threats through a particular software application begin to increase), the security assessment 120 may indicate that the particular type of security threat is on the increase.

In a particular embodiment, the security offering information 116, the evaluation data 118, the security assessment 120, or any combination thereof, may be determined based on the security need profile 108. For example, information from the security need profile 108 may be provided to the first certification organization 124, to the second certification organization 126, to the security assessment source 128, or to any combination thereof, to be analyzed to determine information that is relevant to the computing environment. In another example, the system 102 may generate specific queries to the first certification organization 124, the second certification organization 126, the security assessment source 128, or any combination thereof, based on the security need profile to access information that is relevant to the computing environment.

The system 102 also includes an evaluation and acquisition module 106 coupled to the network interface 114. The evaluation and acquisition module 106 is configured to receive security offerings data 122. The security offerings data 122 may be received from one or more vendors, such as a first vendor 130, a second vendor 132 and a third vendor 134. The security offerings data 122 may include, for example, a list of security offerings and costs associated with the security offerings (e.g., one-time costs, ongoing costs, or both). In a particular embodiment, the security offerings data 122 is received in response to a query from the system 102. For example, the system 102 may request the security offerings data 122 based on the security need profile 108, the security offering information 116, the evaluation data 118, the security assessment 120, or any combination thereof.

The network interface 114 may store all of or a portion of the received data (e.g., the security offering information 116, the evaluation data 118, the security assessment 120, and the security offerings data 122) at the security offering database 110. For example, the security offering database 110 may include a quality measure 140 associated with one or more of the security offerings. The quality measure 140 may be determined based on the evaluation data 118. In another example, the security offerings database 110 may include a price 142 associated with one or more of the security offerings. The price 142 may be determined based on the security offering information 116, the security offering data 122, or both. The price may include information about one-time costs associated with a security offering, ongoing or recurring cots associated with the security offering, or both. In another example, the security offering database 110 may include a relevance level 144. The relevance level 144 is based on rating or ranking one or more security offerings with respect to the security need profile 108 based on the security offering information 116, the evaluation data 118, the security assessment 120, and the security offerings data 122.

The evaluation and acquisition module 106 may also be adapted to receive the evaluation data 118 related to each security offering in the list of security offerings and to compare each security offering in the list of security offerings to the security need profile 108 to determine a match level. The match level may indicate how closely each of the security offerings in the list of security offerings matches criteria specified by the security need profile 108. In a particular embodiment, the evaluation and acquisition module 106 matches multiple criteria determined from the security need profile 108 with the evaluation data 118 to determine which one or more of the security offerings satisfy the criteria, a degree to which the criteria are satisfied, or both. For example, the security offerings may be rated or ranked based on the evaluation data 118 and the security need profile 108.

In a particular embodiment, the evaluation and acquisition module 106 automatically selects one or more security offerings from the list of security offerings based on the match level. For example, the evaluation and acquisition module 106 may automatically select a first security offering from the list of security offerings to provide a particular type and level of security for the computing environment. The evaluation and acquisition module 106 may also automatically select one or more second security offerings from the list of security offerings to provide other types or other levels of security for the computing environment. For example, the evaluation and acquisition module 106 may select the first security offering to provide anti-malware security for the computing environment, and a second security offering to provide SPAM filtering security for the computing environment. Other combinations of selections of security offerings are also possible depending on the security need profile 108 associated with the computing environment.

In a particular embodiment, the evaluation and acquisition module 106 is further configured to receive a second set of security offering data 122, such as a second list of security offerings, and to receive second evaluation data (e.g., a modified or updated version of evaluation data 118) related to each security offering in the second list of security offerings. For example, the second list of security offerings may be received in response to a request received at the user or program interface 108. To illustrate, the request may be generated by a user. In another illustrative example, the request may be automatically generated and provided to the user or program interface 108 periodically or in response to detecting a change in the security need profile 108. The second list of security offerings may also be received in response to a notification from a vendor, such as one of the vendors 130-134, indicating that updated security offerings are available. The second list of security offerings may also be received in response to a notification from the security assessment source 128 indicating a change in the security assessment 120. In another example, the second list of security offerings may be received in response to a notification from one of the certification organizations 124, 126 indicating a change in the security offering information 116 or the evaluation data 118. The evaluation and acquisition module 106 may compare each security offering in the second list of security offerings to the security need profile 108 to determine a second match level and automatically select a second security offering from the second list of security offerings based on the second match level.

After a security offering has been selected by the evaluation and acquisition module 106, the security offering may be automatically deployed. Deploying the security offering may include executing a transaction to purchase or subscribe to the security offering, downloading data or applications associated with the security offering, installing data or applications associated with the security offering, configuring the security offering, or any combination thereof. For example, deploying the security offerings may include installing one or more of the security offerings at a computing asset 170 of the computing environment. The installed security offering(s) may be selected for the computing asset 170 based on a type of the computing asset 170, software installed at the computing asset 170, roles of the computing asset 170, users of the computing asset 170, a level of protection desired for the computing asset 170, a type of protection desired for the computing asset 170, other criteria, or any combination thereof. The security offering(s) installed at the computing asset 170 may be executed to provide security for the computing asset 170 or other computing assets of the computing environment.

In another example, the system 102 may act as an enforcement point and make the security offerings available to a security module 172 at the system 102 to provide security to the computing environment. The evaluation and acquisition module 106 may download or otherwise access the selected security offerings and make the security offerings available to the security module 172. In an illustrative embodiment, the security module 172 includes a firewall that is adapted to utilize security offerings from a plurality of vendors, such as the vendors 130-134. For example, the security offerings may include data such as a list of universal resource locators (URLs) to be filtered out, descriptive information used to identify viruses or malware, and other similar data. In this example, the security module 172 may provide URL filtering based on the list of URLs, virus or malware protection based on the descriptive information, other security based on other security offerings, or any combination thereof.

In a particular embodiment, the evaluation and acquisition module 106 is further configured to generate a security offering recommendation for the computing environment 112 identifying the selected one or more security offerings. The security offering recommendation for the computing environment 112 may be presented to a user via a terminal 136. In a particular embodiment, the security offering recommendation for the computing environment 112 may include a user selectable option that enables the user to authorize the security offering to be deployed.

Figure 2:
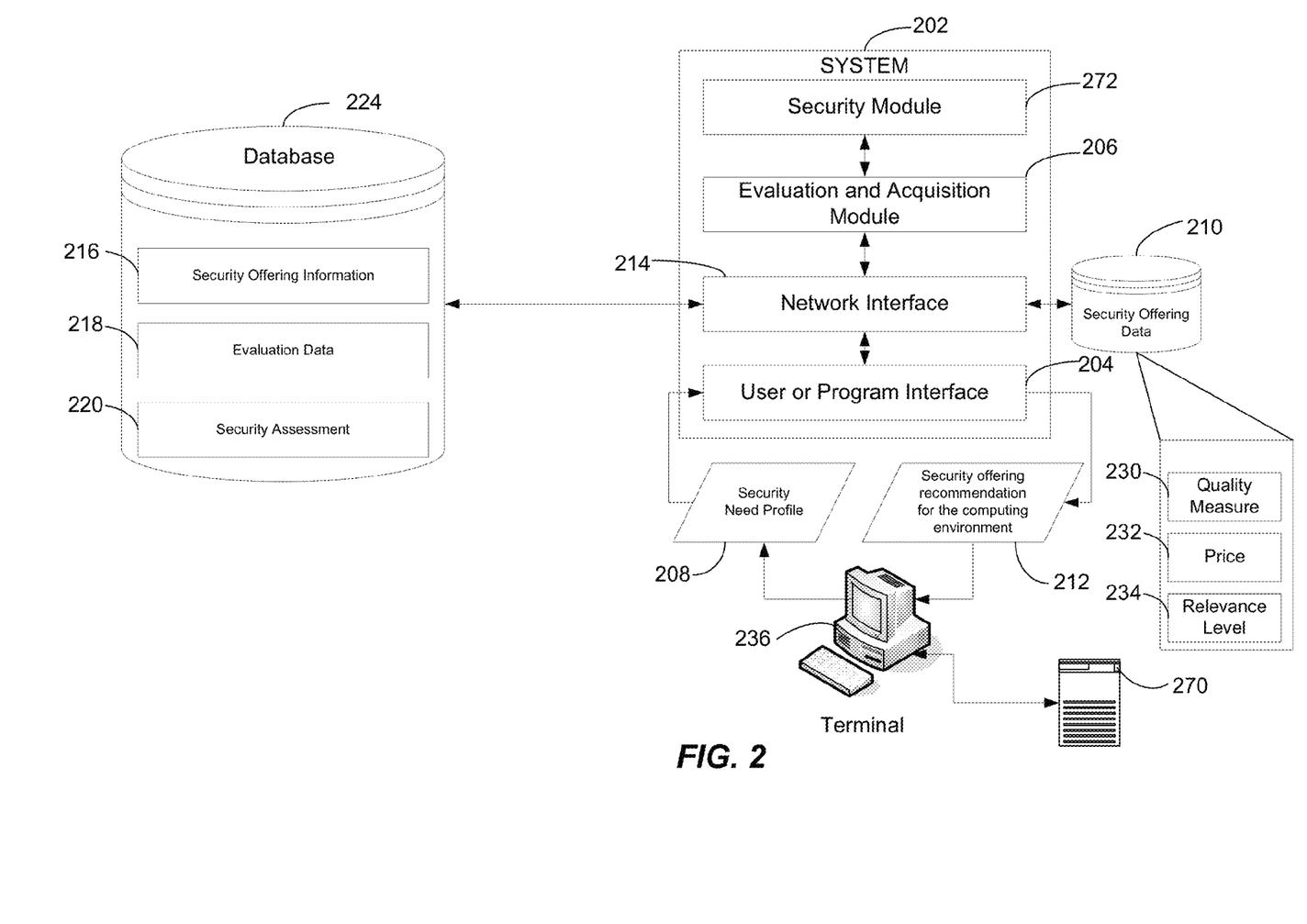
FIG. 2 depicts a second particular embodiment of a system to select security offerings coupled to a system that support the selection of the security offerings.

FIG. 2 depicts a second particular embodiment of a system 202 that is adapted to select security offerings and is coupled to a system that supports the selection of the security offerings. The system 202 is adapted to select security offerings for a computing environment based on information provided about the computing environment. To that end, the system 202 may include a user or program interface 204 adapted to receive a security need profile 208. The security need profile 208 may include information descriptive of the computing environment, information about users of the computing environment, information about uses of the computing environment, other information and constraints that are relevant to the selection of one or more security offerings for the computing environment, or any combination thereof. The security need profile 208 may also include relevance information. The relevance information may indicate how important various aspects of security of the computing environment are to an entity associated with the computing environment (such as, an owner, operator or administrator of the computing environment). In a particular embodiment, the security need profile 208 is provided to the system 202 via the user or program interface 204 by one or more users (e.g., a system administrator) of the computing environment. In another particular embodiment, the security need profile 208 is provided to the system 202 via the user or program interface 204 by a program that collects the information included in the security need profile 208 from the computing environment. In still another particular embodiment, the security need profile 208 is provided to the system 202 via the user or program interface 204 in part by one or more users of the computing environment and in part by a program.

The system 202 also includes a network interface 214. The network interface 214 is adapted to communicate via one or more networks with a database 224 to receive information to select one or more security offerings. The database 224 may include, for example, security offering information 216, evaluation data 218, security assessments 220, other information descriptive of various security offerings, or any combination thereof. In a particular embodiment, access to the database 224 may be provided as a service to users of the system 202. For example, access to the database 224 may be provided as a subscription-based service or as an update service to users of the system 202. The database 224 may be generated by gathering data from various sources, such as the vendors 130-134, the certification organizations 124, 126 or the security assessment source 128 described with reference to FIG. 1, other sources, or by evaluation of various security offerings by a provider of the database 224.

The network interface 214 may store all of or a portion of the received data (e.g., the security offering information 216, the evaluation data 218, the security assessment 220) at a local security offering database 210. For example, the local security offering database 210 may include a quality measure 230 associated with one or more of the security offerings. The quality measure 230 may be determined based on the evaluation data 218. In another example, the security offering database 210 may include a price 232 associated with one or more of the security offerings. The price 232 may be determined based on the security offering information 216. The price 232 may include information about one-time costs associated with a security offering, ongoing or recurring cots associated with the security offering, or both. In another example, the local security offering database 210 may include a relevance level 234. The relevance level 234 is based on rating or ranking one or more security offerings with respect to the security need profile 208 based on the security offering information 216, the evaluation data 218, and the security assessment 220.

The system 202 also includes an evaluation and acquisition module 206 coupled to the network interface 214. The evaluation and acquisition module 206 is configured to receive the security offering information 216, which may include, for example, a list of security offerings and costs associated with the security offerings (e.g., one-time costs, ongoing costs, or both). The evaluation and acquisition module 206 may also be adapted to receive the evaluation data 218 related to each security offering in the list of security offerings and to compare each security offering in the list of security offerings to the security need profile 208 to determine a match level. The match level may indicate how closely each of the security offerings in the list of security offerings matches criteria specified by the security need profile 208. In a particular embodiment, the evaluation and acquisition module 206 matches multiple criteria determined from the security need profile 208 with the evaluation data 218 to determine which one or more of the security offerings satisfy the criteria, a degree to which the criteria are satisfied, or both. For example, the security offerings may be rated or ranked based on the evaluation data 218 and the security need profile 208.

In a particular embodiment, the evaluation and acquisition module 206 automatically selects one or more security offerings from the list of security offerings based on the match level. For example, the evaluation and acquisition module 206 may automatically select a first security offering from the list of security offerings to provide a particular type and level of security for the computing environment. The evaluation and acquisition module 206 may also automatically select one or more second security offering from the list of security offerings to provide other types or other levels of security for the computing environment. For example, the evaluation and acquisition module 206 may select the first security offering to provide anti-malware security for the computing environment, and a second security offering to provide intrusion detection security for the computing environment. Other combinations of selections of security offerings are also possible depending on the security need profile 208 associated with the computing environment.

After a security offering has been selected by the evaluation and acquisition module 206, the security offering may be automatically deployed. Deploying the security offering may include executing a transaction to purchase or subscribe to the security offering, downloading data or applications associated with the security offering, installing data or applications associated with the security offering, configuring the security offering, or any combination thereof. Additionally, deploying the security offerings may include installing one or more of the security offerings at a computing asset 270 of the computing environment. The installed security offering(s) may be selected for the computing asset 270 based on a type of the computing asset 270, software installed at the computing asset 270, roles of the computing asset 270, users of the computing asset 270, a level of protection desired for the computing asset 270, a type of protection desired for the computing asset 270, other criteria, or any combination thereof. The security offering(s) installed at the computing asset 270 may be executed to provide security for the computing asset 270 or other computing assets of the computing environment.

In a particular embodiment, the evaluation and acquisition module 206 is further configured to generate a security offering recommendation for the computing environment 212 identifying the selected one or more security offerings. The security offering recommendation for the computing environment 212 may be presented to a user via a terminal 236. In a particular embodiment, the security offering recommendation for the computing environment 212 may include a user selectable option that enables the user to authorize the security offering to be deployed.

In a particular embodiment, the evaluation and acquisition module 206 is further configured to receive a second set of security offering information 216, such as a second list of security offerings, and to receive second evaluation data (e.g., a modified or updated version of evaluation data 218) related to each security offering in the second list of security offerings. For example, the second list of security offerings may be received in response to a request received at the user or program interface 204. To illustrate, the request may be generated by a user. In another illustrative example, the request may be automatically generated and provided to the user or program interface 204 periodically or in response to detecting a change in the security need profile 208. The second list of security offerings may also be received in response to a determination by a provider of the database 224 that changes to the security offering information 216, evaluation data 218, security assessment 220 or security need profile 208 justify re-evaluating the security offerings. The evaluation and acquisition module 206 may compare each security offering in the second list of security offerings to the security need profile 208 to determine a second match level and automatically select a second security offering from the second list of security offerings based on the second match level. In a particular embodiment, a notification indicating that the selected second security offering is recommended for the computing environment may be sent to a user. The selected second security offering may be automatically downloaded and deployed at the computing environment.

In a particular embodiment, the system 202 includes a security module 272. The security module 272 acts as an enforcement point and provides security to the computing environment using security offerings acquired by the evaluation and acquisition module 206. For example, the evaluation and acquisition module 206 may download or otherwise access the selected security offerings and make the security offerings available to the security module 272. To illustrate, the security module 272 may include a firewall that is adapted to utilize security offerings from the database 224. The security offerings may include data identifying specific security risks to be protected against. For example, the security offerings may include a list of universal resource locators (URLs) to be filtered out. In another example, the security offerings may include descriptive information used to identify viruses or malware. The security module 272 may provide protection against the specific security risks based on the security offerings.

Figure 3:
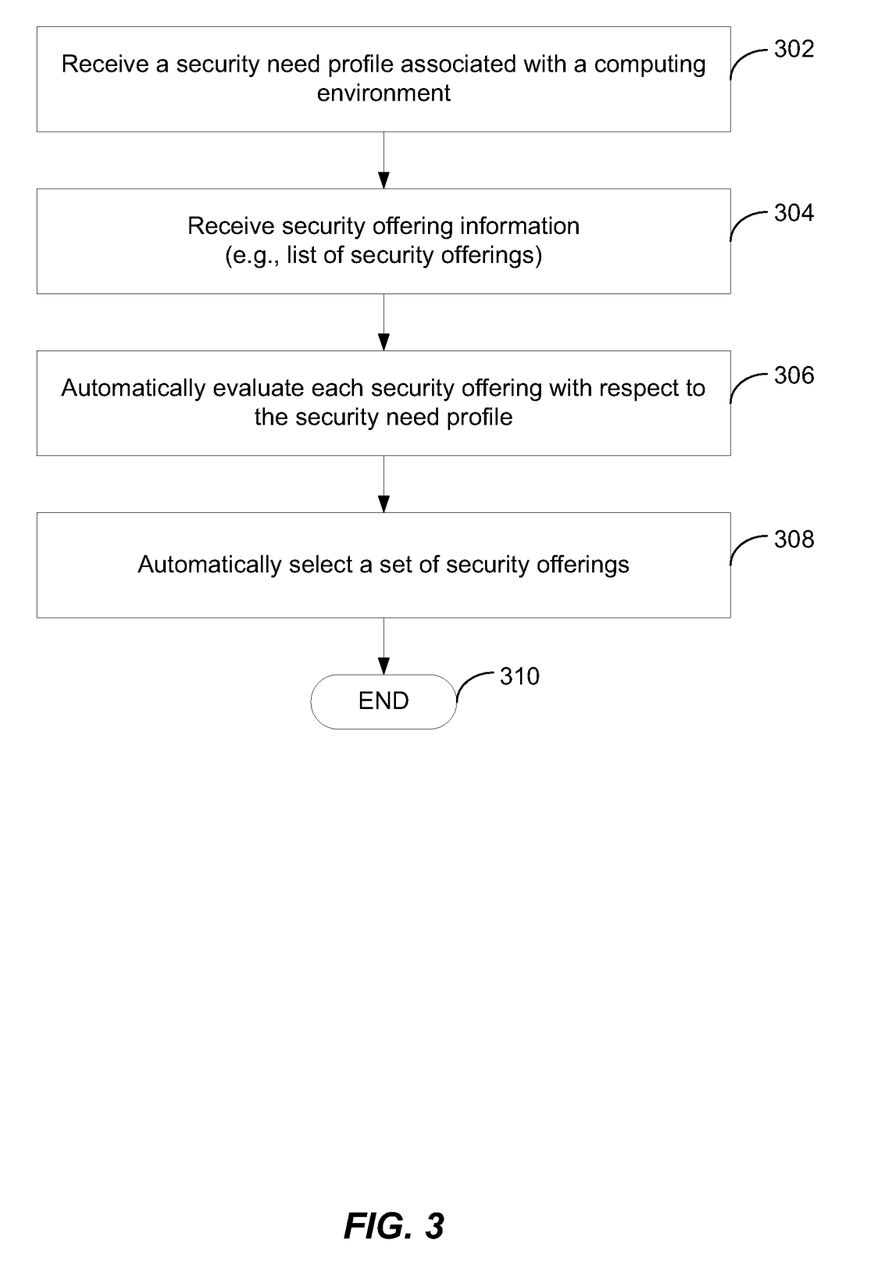
FIG. 3 is a flow diagram depicting a first particular illustrative embodiment of a method of selecting a set of security offerings.

FIG. 3 is a flow diagram depicting a first particular illustrative embodiment of a method of selecting a set of security offerings. In a particular embodiment, the method is implemented using a system such as the system 102 as discussed with reference to FIG. 1 or the system 202 as discussed with reference to FIG. 2. The method includes, at 302, receiving a security need profile associated with a computing environment. For example, the security need profile may include information descriptive of the computing environment, information about users of the computing environment, information about uses of the computing environment, other information and constraints that are relevant to the selection of one or more security offerings for the computing environment, or any combination thereof. The method also includes, at 304, receiving security offering information related to a plurality of security offerings. The method further includes, at 306, automatically evaluating security offerings of the plurality of security offerings with respect to the security need profile. In a particular embodiment, the method includes, at 308, automatically selecting a set of security offerings from the plurality of security offerings. The selected set of security offerings may be provided as a recommendation to a user of the computing environment (e.g., an administrator), may be automatically deployed at the computing environment, or both. The method ends at 310.

Figure 4:
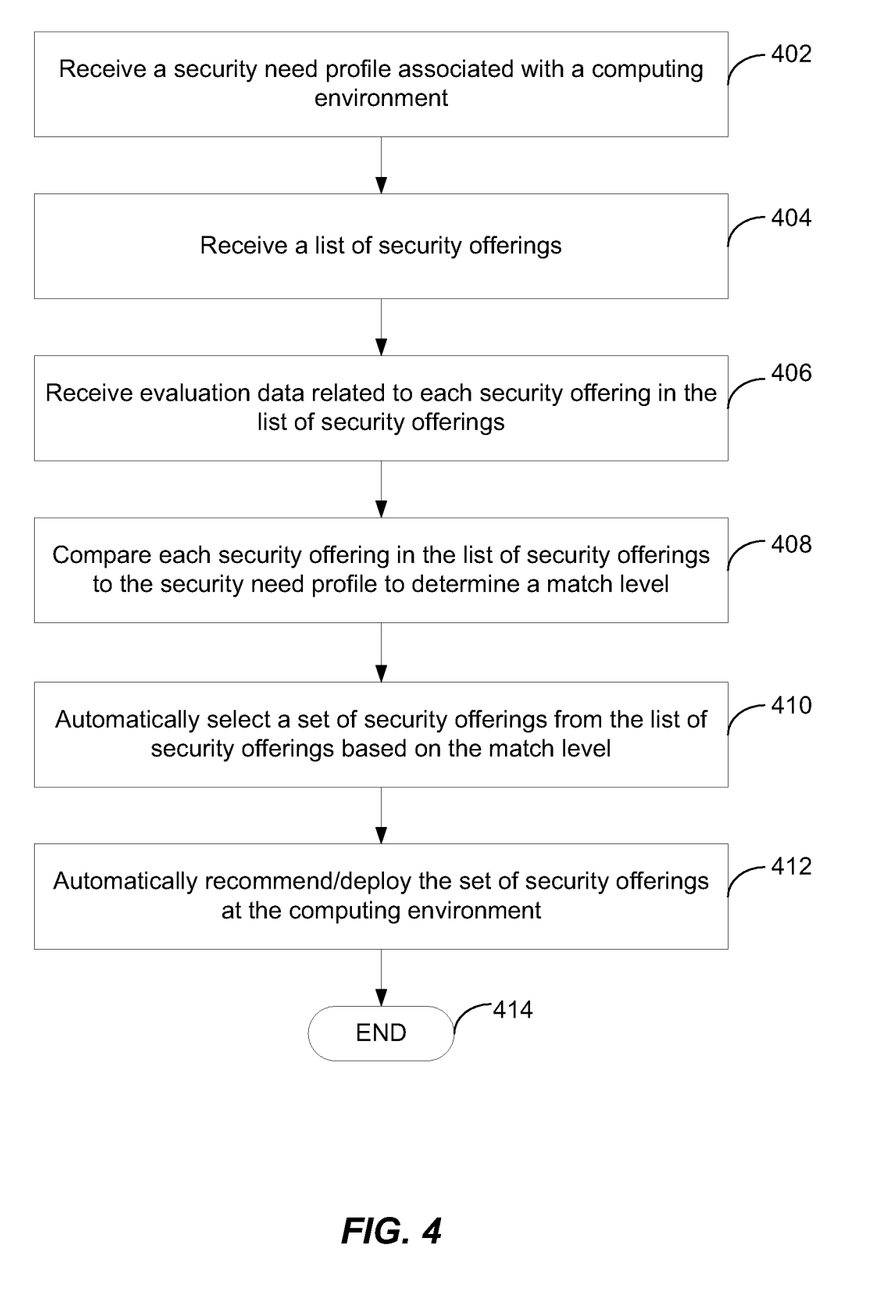
FIG. 4 is a flow diagram depicting a second particular illustrative embodiment of a method of selecting a set of security offerings.

FIG. 4 is a flow diagram depicting a second particular illustrative embodiment of a method of selecting a set of security offerings. In a particular embodiment, the method is implemented using a system such as the system 102 as discussed with reference to FIG. 1 or the system 202 as discussed with reference to FIG. 2. The method includes, at 402, receiving a security need profile associated with a computing environment. The method also includes, at 404, receiving a list of security offerings. For example, the list of security offerings may identify security applications, security devices, or security services offered by one or more vendors. The method may further include, at 406, receiving evaluation data related to each security offering in the list of security offerings. In a particular embodiment, the evaluation data may be provided by one or more third-party entities (i.e., an entity that is not associated with the computing environment and is not associated with the security offerings).

The method further includes, at 408, comparing each security offering in the list of security offerings to the security need profile to determine a match level. For example, each security offering in list of security offerings may be ranked or rated according to how closely it matches various criteria identified based on the security need profile. In a particular embodiment, the method also includes, at 410, automatically selecting a set of security offerings from the list of security offerings based on the match level. The selected set of security offerings may include one or more security offerings. The method may also include, at 412, automatically recommending the set of security offerings, automatically deploying the set of security offerings at the computing environment, or both. The deployed security offerings may be used by one or more devices at the computing environment to provide security for the computing environment. The method ends at 414.

Figure 5:
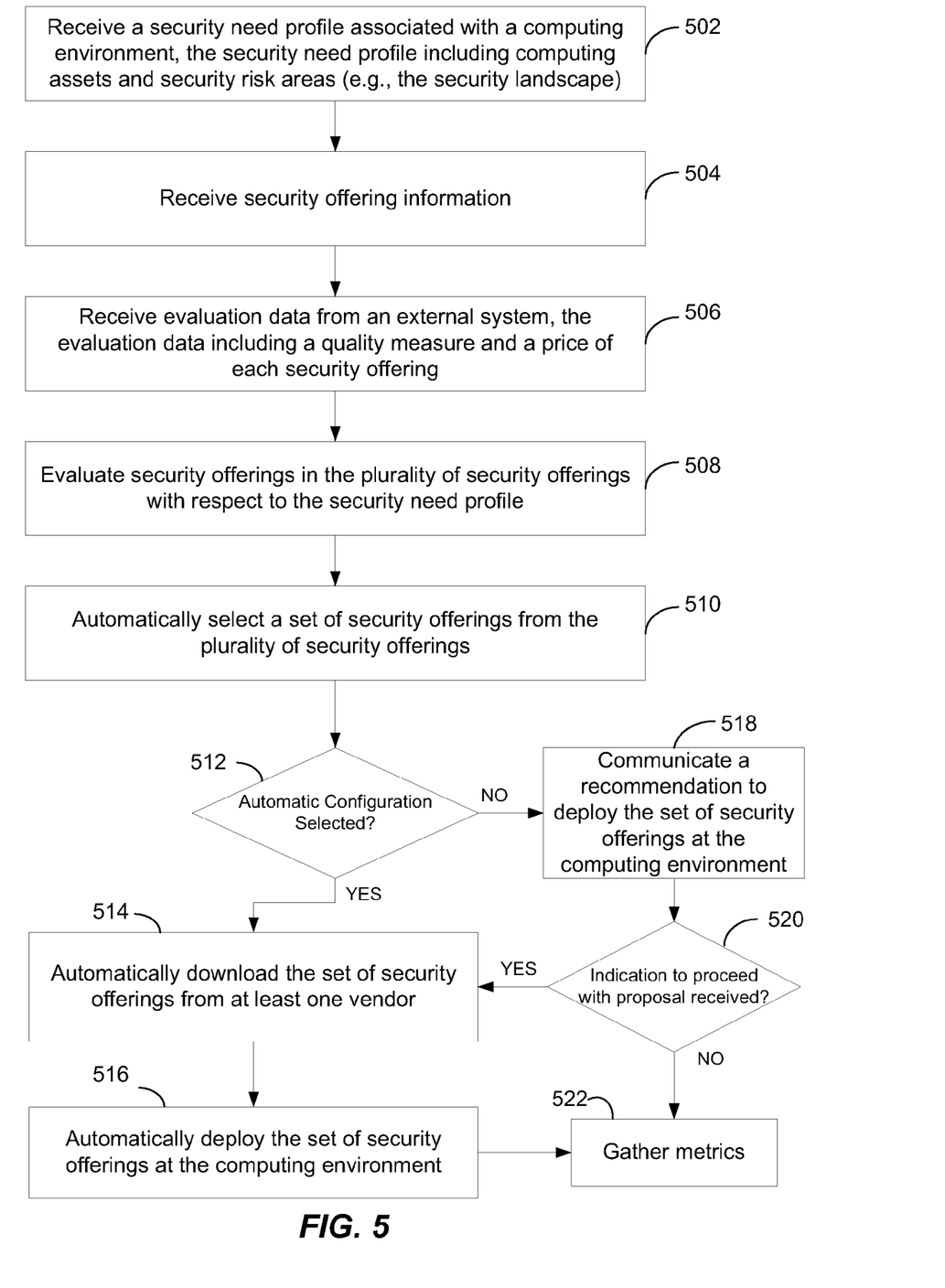
FIG. 5 is a flow diagram depicting a third particular illustrative embodiment of a method of selecting a set of security offerings.

FIG. 5 is a flow diagram depicting a third particular illustrative embodiment of a method of selecting a set of security offerings. In a particular embodiment, the method is implemented using a system such as the system 102 as discussed with reference to FIG. 1 or the system 202 as discussed with reference to FIG. 2. The method includes, at 502, receiving a security need profile associated with a computing environment. The security need profile may identify computing assets and security risk areas associated with the computing environment. For example, the security need profile may include information descriptive of the computing environment, information about users of the computing environment, information about uses of the computing environment, other information and constraints that are relevant to the selection of one or more security offerings for the computing environment, or any combination thereof. The security need profile may also include relevance information indicating how important various aspects of security of the computing environment are to an entity associated with the computing environment (such as, an owner, an operator or an administrator of the computing environment). In a particular embodiment, the security risk areas describe particular scenarios descriptive of uses of the computing environment. For example, the security risk areas may include one or more of a publishing scenario, a forward access scenario, an email protection scenario, a remote access scenario, a download scenario, a transfer scenario, other scenarios descriptive of uses of the computing environment, or any combination thereof. The security need profile may also include other information or constraints related to the computing environment. For example, the security need profile may include a budgetary limitation, a desirable level of protection, an infrastructure constraint, or any combination thereof.

The method illustrated in FIG. 5 also includes, at 504, receiving security offering information. The security offering information may be related to a plurality of security offerings. For example, the security offering information may include a list of security offerings available from one or more vendors. The list of security offerings may include security offerings related to various types of security threats. The method further includes, at 506, receiving evaluation data from an external system. For example, the evaluation data may be received from a certification organization (e.g., an organization that reviews, rates or otherwise evaluated security offerings), such as the first certification organization 124 or the second certification organization 126 as discussed with reference to FIG. 1. In another example, the evaluation data may be received from a service provider that collects and catalogs such information as a service, such as a service provider associated with the database 224 as discussed with reference to FIG. 2. In a particular embodiment, the evaluation data includes a quality measure and a price of each security offering.

The method also includes, at 508, evaluating security offerings of the plurality of security offerings with respect to the security need profile. For example, specific characteristics of each security offering may be compared to the security need profile to select one or more security offerings. For example, evaluating the security offering may include determining a match level associated with each security offering in the set of security offerings. The match level may be determined based on an assessment of the quality measure, the price, and a relevance level of the security offerings with respect to the security need profile.

The method further includes, at 510, automatically selecting a set of security offerings from the plurality of security offerings. The set of security offerings selected may include one security offering or a plurality of security offerings. For example, a single security offering may be selected which most closely matches the security need profile. In another example, several security offerings may be selected, where each security offering most closely matches the security need profile for one or more particular types of security risks. To illustrate, a first security offering may be selected to provide firewall protection and a second security offering may be selected to provide adware protection. Likewise, security offerings may be selected that include a universal resource locator (URL) filtering technology, an antivirus technology, an anti-malware technology, an intrusion detection technology, an intrusion prevention technology, a content filtering technology, a connection filtering technology, a spam detection technology, technologies to address other security risks, or any combination thereof. In a particular embodiment, the method includes receiving a security assessment from a security assessment service. The set of security offerings may also be selected based at least in part on the security assessment.

The method illustrated in FIG. 5 may also include, at 512, determining whether automatic configuration has been selected. When automatic configuration has been selected, the method may include, at 514, automatically downloading the set of security offerings from at least one vendor. The method may also include, at 516, automatically deploying the set of security offerings at the computing environment. For example, the set of security offerings may be automatically installed at one or more computing devices of the computing environment.

When automatic configuration has not been selected, the method may include, at 518, communicating a recommendation to deploy the set of security offerings at the computing environment. For example, an electronic notification including the recommendation may be sent to a user associated with the computing environment (such as an owner, an administrator, or another user with authority to modify the computing environment). In a particular embodiment, the electronic notification also includes a user selectable authorization option, such as a hyperlink or control button. Selection of the user selectable authorization option may cause an indication to proceed with the proposed recommendation to be sent. The method further includes, at 520, determining whether the indication to proceed with the proposed recommendation was received. When no indication to proceed with the proposed recommendation is received, the method proceeds to 522 to gather metrics regarding the performance of the set of security offerings at the computing environment. The metrics may be used to re-evaluate the selected set of security offerings. For example, the metrics may be used at the computing environment to determine a new security need profile (e.g., where the metrics may indicate that the security needs of the computing environment have changed). In another example, the metrics may be used to determine new evaluation data or a new security assessment. To illustrate, the metrics may be related to the efficiency or quality of security offerings deployed at the computing environment, such as how well the security offerings are performing generally or at a specific computing asset. In another illustrative example, the metrics may be related to what threats the set of security offerings are actually encountering (e.g., number and type of intrusion attempts detected, etc.). In a particular embodiment, the metrics are sent to an organization (such as one of the certification organizations 124, 126 or the security assessment source 128 discussed with reference to FIG. 1, or a provider of the database 224 discussed with reference to FIG. 2) that collects metrics from a number or computing environments (e.g., multiple customers or users of security services) and aggregates the collected metrics to determine evaluation data (e.g., how well various security offering are performing where they are deployed), security offering information (e.g., user feedback regarding ease of use or maintenance of various security offerings), security assessments (e.g., the security landscape, such as types of security risks are being noted by various security offerings), or any combination thereof.

When the indication to proceed with the proposed recommendation is received, the method proceeds, at 514 and 516, to automatically download the set of security offerings from at least one vendor and automatically deploy the set of security offerings at the computing environment. After the set of security offerings is deployed, the method may proceed to 522 to re-evaluate the set of security offerings based on changes to the security need profile, the security offering information, the evaluation data, or other information used to select the set of security offerings, as discussed above.

Figure 6:
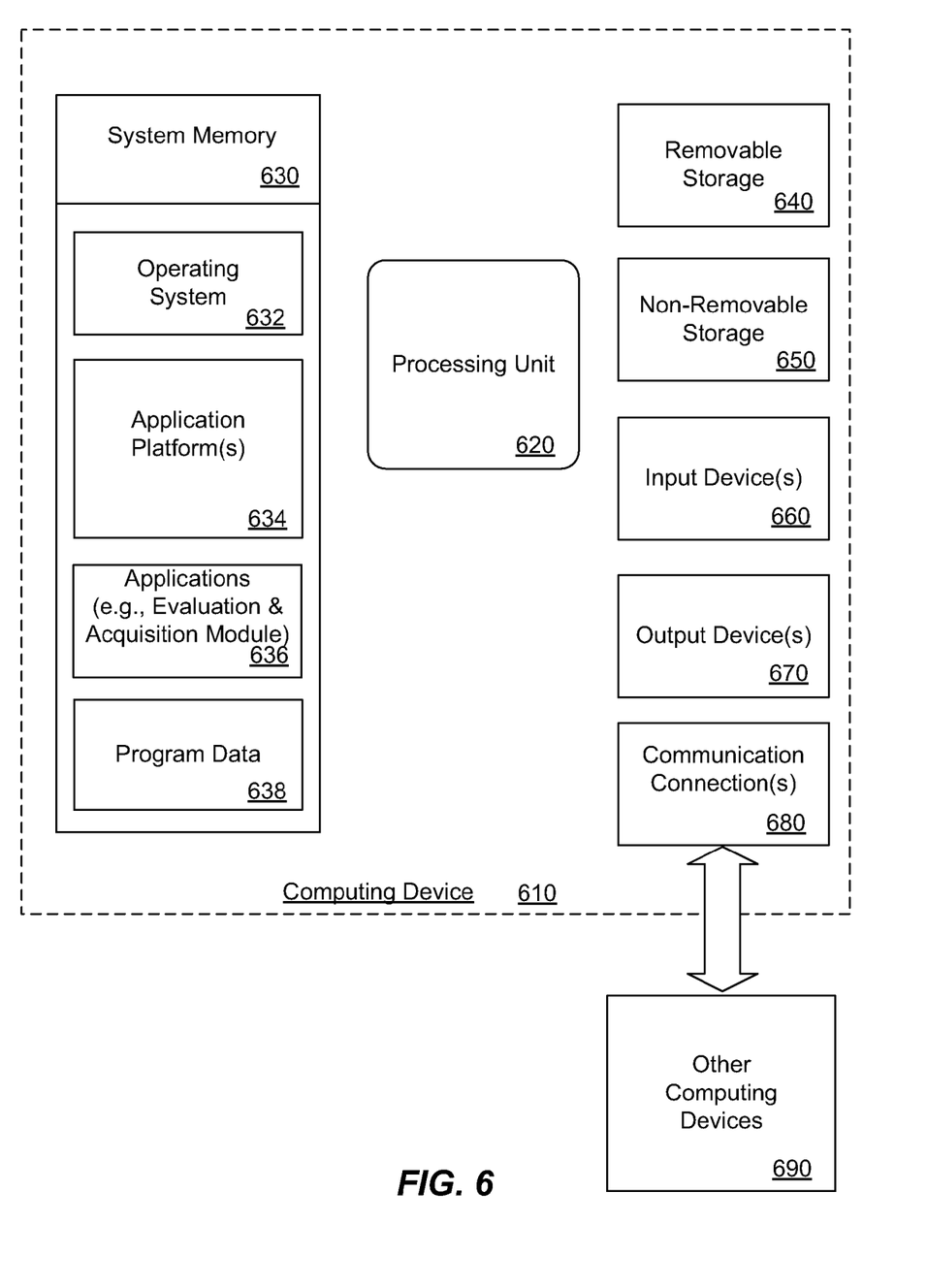
FIG. 6 is a block diagram depicting a general purpose computing system operable to enable computer-implemented methods and computer-readable media.

FIG. 6 shows a block diagram of a computing environment 600 including a general purpose computer device 610 operable to support embodiments of computer-implemented methods and computer program products according to the present disclosure. In a basic configuration, the computing device 610 may include a system configured to receive information about security offerings and to select one or more security offerings, such as described with reference to FIGS. 1 and 2.

The computing device 610 typically includes at least one processing unit 620 and system memory 630. Depending on the exact configuration and type of computing device, the system memory 630 may be volatile (such as random access memory or "RAM"), non-volatile (such as read-only memory or "ROM," flash memory, and similar memory devices that maintain the data they store even when power is not provided to them) or some combination of the two. The system memory 630 typically includes an operating system 632, one or more application platforms such as an object-oriented platform 634 such as Java, one or more applications 636 (e.g., the evaluation and acquisition modules 106 and 206 illustrated in FIGS. 1 and 2), and may include program data 638.

The computing device 610 may also have additional features or functionality. For example, the computing device 610 may also include removable and/or non-removable additional data storage devices such as magnetic disks, optical disks, tape, and standard-sized or miniature flash memory cards. Such additional storage is illustrated in FIG. 6 by removable storage 640 and non-removable storage 650. Computer storage media may include volatile and/or non-volatile storage and removable and/or non-removable media implemented in any method or technology for storage of information such as computer-readable instructions, data structures, program components or other data. The system memory 630, the removable storage 640 and the non-removable storage 650 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 610. Any such computer storage media may be part of the device 610. The computing device 610 may also have input device(s) 660 such as a keyboard, mouse, pen, voice input device, touch input device, etc. Output device(s) 670 such as a display, speakers, printer, etc. may also be included.

The computing device 610 also contains one or more communication connections 680 that allow the computing device 610 to communicate with other computing devices 690, such as one or more client computing systems or other servers, over a wired or a wireless network. The one or more communication connections 680 are an example of communication media. By way of example, and not limitation, communication media may include wired media such as a wired network or direct-wired connection, and wireless media such as acoustic, RF, infrared and other wireless media. It will be appreciated, however, that not all of the components or devices illustrated in FIG. 6 or otherwise described in the previous paragraphs are necessary to support embodiments as herein described.

The steps of a method or algorithm described in connection with the embodiments disclosed herein may be embodied directly in hardware, in a software component executed by a processor, or in a combination of the two. A software component may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an integrated component of a computing device or a user terminal. In the alternative, the processor and the storage medium may reside as discrete components in a computing device or user terminal.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
receiving a security need profile associated with a computing environment at a computer, the security need profile including information about users of the computing environment;
receiving, at the computer, security offering information related to a plurality of security offerings from a plurality of vendors, wherein the security offering information includes evaluation data including one or more of objective testing information or rating information from a certification organization for at least one of the security offerings and pricing information for at least one of the security offerings based on a one-time cost and an on-going cost; and
automatically evaluating, at the computer, the plurality of security offerings with respect to the security need profile and with respect to the information about users of the computing environment to select a particular set of security offerings from the plurality of security offerings, the particular set of security offerings determined by the computer.

2. The method of claim 1, further comprising:
automatically downloading the particular set of security offerings from at least one vendor; and
automatically deploying the particular set of security offerings at the computing environment, wherein automatically evaluating, automatically selecting, automatically downloading and automatically deploying are performed by the computer without user involvement.

3. The method of claim 1, further comprising communicating a recommendation to deploy the particular set of security offerings at the computing environment.

4. The method of claim 3, further comprising:
receiving an indication to proceed with the recommendation;
automatically downloading the particular set of security offerings from at least one vendor; and
automatically deploying the particular set of security offerings at the computing environment.

5. The method of claim 1, further comprising providing protection of the computing environment against specific security risks identified in the particular set of security offerings.

6. The method of claim 1, wherein the security offering information related to the plurality of security offerings includes a list of security offerings, and wherein the security need profile identifies computing assets and a list of security risk areas.

7. The method of claim 6, wherein the list of security risk areas includes at least one of a publishing scenario, a forward access scenario, an email protection scenario, a download scenario, and a transfer scenario.

8. The method of claim 1, wherein the security need profile further comprises an infrastructure constraint.

9. The method of claim 1, further comprising determining a match level that indicates how closely each of the security offerings matches multiple criteria determined from the security need profile by determining a degree to which the multiple criteria are satisfied by each of the security offerings.

10. The method of claim 9, further comprising automatically selecting a first security offering from the set of security offerings to provide a first type and a first level of security for the computing environment and automatically selecting a second security offering from the set of security offerings to provide a second type and a second level of security for the computing environment.

11. The method of claim 1, wherein the particular set of security offerings includes multiple security offerings.

12. The method of claim 1, further comprising receiving evaluation data from an external system, wherein the evaluation data includes a quality measure and, wherein the on-going cost information includes information related to at least one of subscription costs, update costs, and maintenance costs associated with the at least one security offering.

13. The method of claim 1, further comprising determining a match level associated with each security offering in the particular set of security offerings, wherein the match level is determined based on an assessment of a quality measure, the price, and a relevance level of the security offerings as compared to the security need profile, wherein the relevance level indicates various aspects of security of the computing environment with respect to an owner, an operator, or an administrator of the computer environment.

14. The method of claim 13, further comprising receiving a security assessment from a security assessment service, and wherein the particular set of security offerings is selected based at least in part on the security assessment.

15. The method of claim 1, wherein one of the security offerings has a technology type of at least one of a universal resource locator (URL) filtering technology, an intrusion detection technology, an intrusion prevention technology, a content filtering technology, a connection filtering technology, and a spam detection technology.

16. A system, comprising:
a user or program interface configured to receive a security need profile associated with a computing environment, the security need profile including a level of security for the computing environment;
a network interface; and
an evaluation and acquisition module coupled to the network interface, the evaluation and acquisition module configured to:
receive a list of security offerings from a plurality of vendors;
receive evaluation data related to each security offering identified in the list of security offerings, wherein the evaluation data includes one or more of objective testing information or rating information from a certification organization for at least one of the security offerings and pricing information for at least one of the security offerings based on a one-time cost and an on-going cost;
compare each security offering in the list of security offerings to the security need profile to determine a match level, the comparison based on the information about the level of security for the computing environment; and
automatically select a first security offering from the list of security offerings for acquisition based on the match level.

17. The system of claim 16, wherein the evaluation and acquisition module is further configured in response to a change in the security need profile to:
receive a second list of security offerings;
receive second evaluation data related to each security offering in the second list of security offerings;
compare each security offering identified in the second list of security offerings to the security need profile to determine a second match level; and automatically select a second security offering from the second list of security offerings based on the second match level.

18. The system of claim 17, wherein the evaluation and acquisition module is further configured to automatically deploy the first security offering and the second security offering at the computing environment by executing a transaction to purchase or subscribe to the first and second security offerings.

19. The system of claim 17, wherein the second list of security offerings is received periodically.

20. A computer-readable storage device comprising instructions that, when executed by a computer, cause the computer to:
- receive a security need profile associated with a computing environment at a computer, the security need profile including information about users of the computing environment;
- receive a list of security offerings from a plurality of vendors;
- receive evaluation data related to each security offering in the list of security offerings wherein the evaluation data includes one or more of objective testing information or rating information from a certification organization for at least one of the security offerings and pricing information indicating one or more of a one-time purchase cost with an on-going cost or a subscription cost associated with each security offering;
- compare each security offering identified in the list of security offerings to the security need profile to determine a match level, the comparison based on the information about users of the computing environment; and
- automatically select a set of security offerings for acquisition from the list of security offerings based on the match level.

* * * * *